(12) United States Patent
Lee

(10) Patent No.: US 11,585,425 B2
(45) Date of Patent: Feb. 21, 2023

(54) TRANSMISSION MOUNT FOR VEHICLE

(71) Applicants: Hyundai Motor Company, Seoul (KR); Kia Motors Corporation, Seoul (KR)

(72) Inventor: Seung Ho Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 17/035,281

(22) Filed: Sep. 28, 2020

(65) Prior Publication Data

US 2021/0388894 A1 Dec. 16, 2021

(30) Foreign Application Priority Data

Jun. 10, 2020 (KR) ........................ 10-2020-0070095

(51) Int. Cl.
| | |
|---|---|
| *F16H 57/02* | (2012.01) |
| *F16F 13/10* | (2006.01) |
| *F16H 57/028* | (2012.01) |
| *F16H 57/025* | (2012.01) |

(52) U.S. Cl.
CPC .......... *F16H 57/028* (2013.01); *F16F 13/10* (2013.01); *F16F 13/107* (2013.01); *F16H 57/025* (2013.01); *F16F 2226/04* (2013.01); *F16F 2226/045* (2013.01); *F16F 2228/066* (2013.01); *F16F 2230/0005* (2013.01); *F16F 2232/08* (2013.01)

(58) Field of Classification Search
CPC .......... F16F 13/10; F16F 13/16; F16F 13/107; F16F 13/101; F16F 13/103; F16F 2232/08; F16F 13/1463; F16F 2226/04; F16F 2226/045; F16F 2228/066; F16F 2230/0005; F16H 57/025; F16H 57/028
USPC ............................................. 267/140, 140.13
See application file for complete search history.

(56) References Cited

U.S. PATENT DOCUMENTS

| | | | | |
|---|---|---|---|---|
| 5,273,261 | A * | 12/1993 | Hamberg ............. | B60K 5/1241 180/312 |
| 5,704,598 | A * | 1/1998 | Kojima ................... | F16F 13/10 267/140.13 |
| 5,788,207 | A * | 8/1998 | Bunker .................... | F16F 15/08 267/141 |
| 9,739,333 | B2 * | 8/2017 | Michiyama .......... | B60K 5/1208 |
| 9,796,255 | B2 * | 10/2017 | Inatomi ................ | B60K 5/1241 |
| 9,933,038 | B2 * | 4/2018 | Kojima ................... | F16F 13/14 |
| 10,208,847 | B1 * | 2/2019 | Lee ........................ | F16F 1/3713 |
| 2001/0011790 | A1 * | 8/2001 | Satori ..................... | F16F 13/14 267/140.13 |
| 2003/0168789 | A1 * | 9/2003 | Kries .................... | F16F 13/105 267/140.13 |

(Continued)

*Primary Examiner* — Robert A. Siconolfi
*Assistant Examiner* — James K Hsiao
(74) *Attorney, Agent, or Firm* — Fox Rothschild LLP

(57) ABSTRACT

A bush-type transmission mount, in which an orifice, operating as a fluid passage that connects a first fluid chamber and a second fluid chamber to each other, is directly formed to a desired length in a core that is coupled to a main rubber to improve vibration-damping characteristics. A membrane is fitted into an outlet portion of the orifice, which communicates with the first fluid chamber, in a sliding manner, thereby improving low-frequency idle vibration and high-frequency dynamic characteristics.

12 Claims, 6 Drawing Sheets

(56) References Cited

U.S. PATENT DOCUMENTS

| | | | |
|---|---|---|---|
| 2004/0188899 A1* | 9/2004 | Ichikawa | F16F 13/264 267/140.3 |
| 2007/0199742 A1* | 8/2007 | Miyahara | B60K 5/04 180/374 |
| 2008/0284075 A1* | 11/2008 | Saito | F16F 13/105 267/140.13 |
| 2009/0321202 A1* | 12/2009 | Hamada | F16F 13/1463 188/322.5 |
| 2011/0001281 A1* | 1/2011 | Kanaya | F16F 13/18 267/140.13 |
| 2012/0267184 A1* | 10/2012 | Joly | F16F 13/10 180/291 |
| 2013/0038006 A1* | 2/2013 | Saito | F16F 13/1463 267/140.13 |
| 2014/0175719 A1* | 6/2014 | Kanaya | F16F 13/106 267/140.13 |
| 2015/0226285 A1* | 8/2015 | Schnaars | F16F 13/10 267/140.13 |
| 2015/0252866 A1* | 9/2015 | Muraoka | F16F 13/085 267/140.13 |
| 2015/0345583 A1* | 12/2015 | Ishikawa | B60K 5/1291 267/141 |
| 2016/0238102 A1* | 8/2016 | Goto | F16F 13/103 |
| 2016/0252149 A1* | 9/2016 | Scharf | F16F 13/10 267/140.13 |
| 2016/0305505 A1* | 10/2016 | Kadowaki | B60K 5/1216 |
| 2016/0341275 A1* | 11/2016 | Kaneko | B60K 5/1208 |
| 2017/0211648 A1* | 7/2017 | Kadowaki | F16F 1/36 |
| 2017/0299013 A1* | 10/2017 | Kojima | F16F 15/08 |
| 2017/0335920 A1* | 11/2017 | Kanaya | B60K 5/1208 |
| 2018/0023655 A1* | 1/2018 | Komiya | F16F 13/10 267/140.13 |
| 2018/0163842 A1* | 6/2018 | Kim | F16H 57/025 |
| 2018/0172135 A1* | 6/2018 | Kwon | B60K 17/04 |
| 2018/0223945 A1* | 8/2018 | Ohletz | F16F 9/342 |
| 2019/0072174 A1* | 3/2019 | Kim | B60K 5/1208 |
| 2019/0120365 A1* | 4/2019 | Kim | F16H 57/025 |
| 2019/0128363 A1* | 5/2019 | Kim | F16F 13/101 |
| 2019/0154097 A1* | 5/2019 | Lee | F16F 1/377 |
| 2022/0010858 A1* | 1/2022 | Kim | F16F 13/1427 |

\* cited by examiner

TRANSMISSION MOUNT FOR VEHICLE

CROSS-REFERENCE TO RELATED APPLICATION

This application claims under 35 U.S.C. § 119(a) the benefit of priority to Korean Patent Application No. 10-2020-0070095 filed on Jun. 10, 2020, the entire contents of which are incorporated herein by reference.

BACKGROUND

(a) Technical Field

The present disclosure relates to a transmission mount for a vehicle, and more particularly, to a hydraulic transmission mount for a vehicle, which has an integrated core/orifice structure in which an orifice, which is a fluid passage, is directly formed in a core, thereby achieving improved vibration-damping characteristics.

(b) Background Art

In general, when a powertrain of a vehicle, which includes an engine and a transmission, is mounted in an engine compartment, the engine is supported by an engine mount, and the transmission is supported by a separate transmission mount to effectively reduce the transfer of vibration and noise from the powertrain to the vehicle body. With the recent trend in which the importance of improvement of riding performance and noise, vibration and harshness (NVH) performance of a vehicle is emphasized, a transmission mount has been embodied as a hydraulic transmission mount in which fluid is sealed to be capable of flowing therein, similar to an engine mount in which fluid is sealed.

Examples of a hydraulic transmission mount include a bush-type transmission mount and a box-type transmission mount. Both the bush-type transmission mount and the box-type transmission mount are manufactured in a structure in which fluid is sealed to flow upwards and downwards. However, there is a difference between the mounts in that the bush-type transmission mount is manufactured in a structure in which a membrane configured to be deformed by the fluid is absent, but the box-type transmission mount is manufactured in a structure in which a membrane configured to be deformed by fluid is present.

Among the examples of the hydraulic transmission mount, the bush-type transmission mount has the following shortcomings. First, there is a limitation in tuning vibration damping value characteristics. In other words, in the box-type transmission mount, since an orifice serving as a fluid passage is long and a fluid-pumping area is large, the freedom of tuning a vibration damping value is secured. However, in the bush-type transmission mount, since an orifice serving as a fluid passage is short and a fluid-pumping area is small, there is a limitation in tuning a vibration damping value.

Second, there is a limitation in improving dynamic characteristics due to absence of a membrane. A membrane improves low-frequency idle vibration and high-frequency dynamic characteristics. However, since such a membrane is not included in the bush-type transmission mount, there is a limitation in improving dynamic characteristics for attenuating vibration of the transmission mount.

The above information disclosed in this section is merely for enhancement of understanding of the background of the invention, and therefore it may contain information that does not form the related art that is already known in this country to a person of ordinary skill in the art.

SUMMARY

The present invention provides a bush-type transmission mount, in which an orifice, operating as a fluid passage that connects a first fluid chamber and a second fluid chamber, is directly formed to a desired length in a core that is coupled to a main rubber, thereby achieving improved vibration-damping characteristics, and in which a membrane is fitted into an outlet portion of the orifice, which communicates with the first fluid chamber, in a sliding manner, thereby improving low-frequency idle dynamic characteristics and high-frequency dynamic characteristics.

In one aspect, the present invention provides a transmission mount for a vehicle, that may include an inner pipe, a main rubber vulcanized and formed on the inner surface of the inner pipe to form a first fluid chamber therein, a core having an orifice block fitted into the main rubber, the orifice block having therein an orifice formed to a predetermined length to connect the first fluid chamber to a second fluid chamber such that the first fluid chamber and the second fluid chamber communicate with each other, a mounting block integrally formed with a first side of the orifice block to be mounted to a transmission, and a chamber block integrally formed with a second side of the orifice block, the chamber block having therein the second fluid chamber, a membrane mounted in the portion of the orifice that communicates with the first fluid chamber, among the entire length of the orifice formed in the orifice block, a diaphragm coupled to the chamber block to seal the second fluid chamber, and an outer pipe coupled to the outer diameter portion of the inner pipe to be connected to the vehicle body.

In an exemplary embodiment, the orifice block and the main rubber may include first fluid flow apertures formed therein to allow the orifice and the first fluid chamber to communicate with each other, and the second fluid chamber may include a second fluid flow aperture formed in the inner wall surface thereof to allow the orifice and the second fluid chamber to communicate with each other. In addition, a membrane assembly aperture may be formed in the inner wall surface of the second fluid chamber, which is formed in the chamber block of the core, to insert the membrane into the portion of the orifice that communicates with the first fluid chamber, among the entire length of the orifice.

Further, a slide groove may be formed in the portion of the orifice that communicates with the first fluid chamber, among the entire length of the orifice, and the membrane inserted into the membrane assembly aperture may slide in and be fitted into the slide groove. A diaphragm-fixing frame may be mounted to the chamber block to press and fix the peripheral portion of the diaphragm to the peripheral surface of the chamber block.

In addition, fastening ends may be integrally formed with the edge of the diaphragm-fixing frame, and fastening recesses may be formed in the circumferential portion of the chamber block and thus, the fastening ends may be inserted and fastened thereinto in a caulking or curling manner. A core cover may be mounted to the upper portion of the orifice block to cover and seal the orifice in an open state.

A press-fit aperture may be formed in the upper portion of the main rubber, and the orifice block of the core may be press-fitted into the press-fit aperture. In addition, when the main rubber is vulcanized and formed in the inner pipe, the orifice block of the core may be vulcanized and formed together with the main rubber.

When large-displacement vibration of the transmission is input through the mounting block of the core, fluid in the first fluid chamber may flow to the second fluid chamber through the orifice to attenuate the large-displacement vibration. When small-displacement vibration of the transmission is input through the mounting block of the core, fluid in the first fluid chamber may press the membrane to thus deform the membrane upwards and downwards to attenuate the small-displacement vibration.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
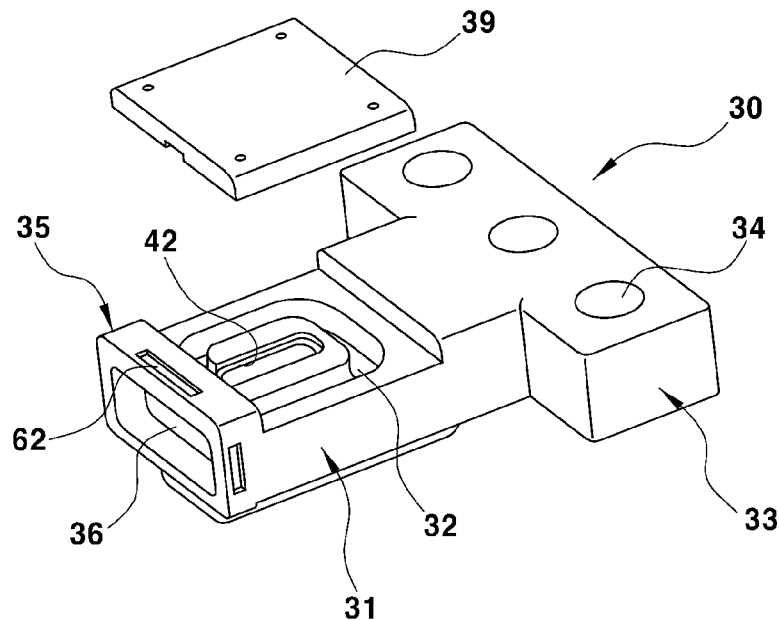
FIG. 1 is a perspective view of a core of a transmission mount for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 6:
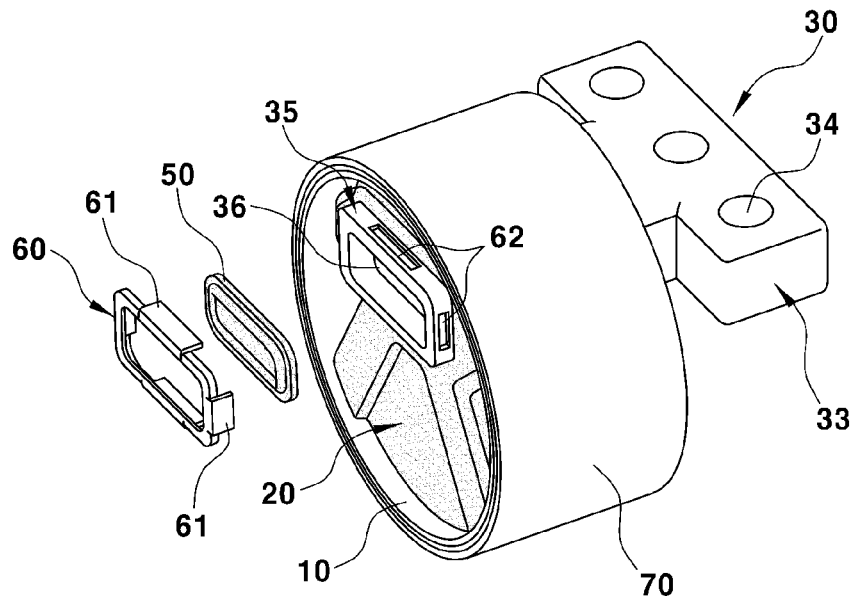
FIG. 6 is a perspective view showing the process of assembling a diaphragm to the core in the transmission mount for a vehicle according to the present invention.
Figure 7:
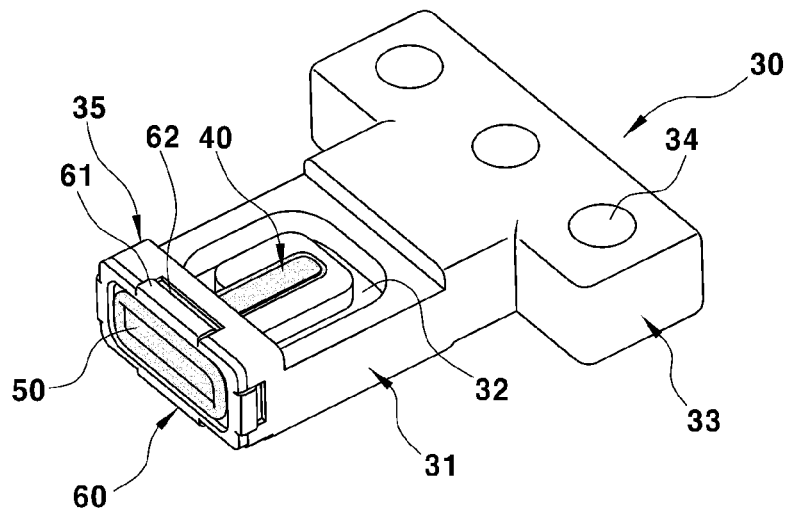
FIG. 7 is a perspective view showing the state in which the membrane and the diaphragm are assembled to the core in the transmission mount for a vehicle according to the present invention.
Figure 8:
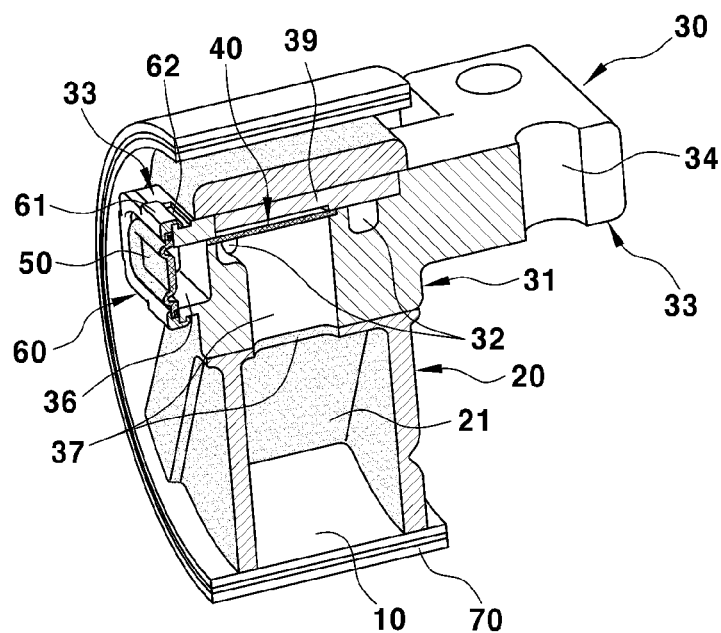
FIG. 8 is a sectional perspective view of the transmission mount for a vehicle according to the present invention.

FIGS. 1 to 6 are views sequentially showing the process of assembling a transmission mount for a vehicle according to the present invention, FIG. 7 is a view showing the state in which a membrane and a diaphragm are assembled to a core of the present invention, and FIG. 8 is a view showing the state in which the transmission mount according to the present invention is completely assembled.

As shown in FIGS. 2 to 6 and 8, a main rubber 20 forming a first fluid chamber 21 may be vulcanized and formed on the inner surface of an inner pipe 10, which forms an inner frame of the transmission mount. As shown in FIG. 8, the first fluid chamber 21 may be an empty space formed in the lower portion of the main rubber 20. The first fluid chamber 21 may be surrounded by the main rubber 20, and the bottom surface thereof may be defined by the inner pipe 10.

A core 30 may be coupled to the upper portion of the main rubber 20, which is vulcanized and formed in the inner pipe 10. Accordingly, the core 30, as shown in FIG. 1, may include an orifice block 31, in which an orifice 32 operating as a fluid passage is formed, a mounting block 33, integrally formed with a first side of the orifice block 31, and a chamber block 35, integrally formed with a second side (opposite to the first side) of the orifice block 31.

The orifice block 31 of the core 30 may be formed in a structure in which the orifice 32, having a predetermined length and operating as a fluid passage, is concavely formed in a concentric circle pattern in the top surface thereof. The mounting block 33 of the core 30 may be formed in a rectangular plate structure in which a mounting hole 34 is formed for mounting to a predetermined position of a transmission (not shown). The chamber block 35 of the core 30 may be formed in a structure in which a second fluid chamber 36 is formed to communicate with the orifice 32.

Figure 4:
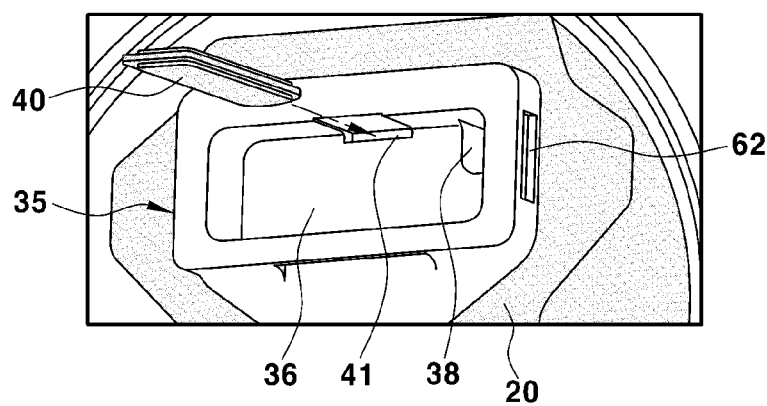
FIG. 4 is an enlarged perspective view of essential parts to show the process of assembling a membrane to the core in the transmission mount for a vehicle according to the present invention.
Figure 5:
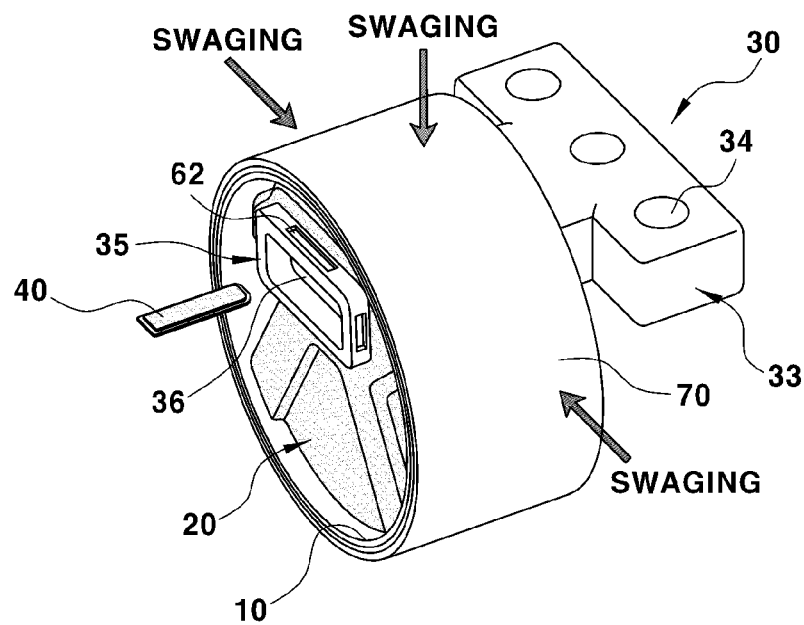
FIG. 5 is a perspective view showing the state in which an outer pipe is assembled to an inner pipe in the transmission mount for a vehicle according to the present invention.
Figure 10:
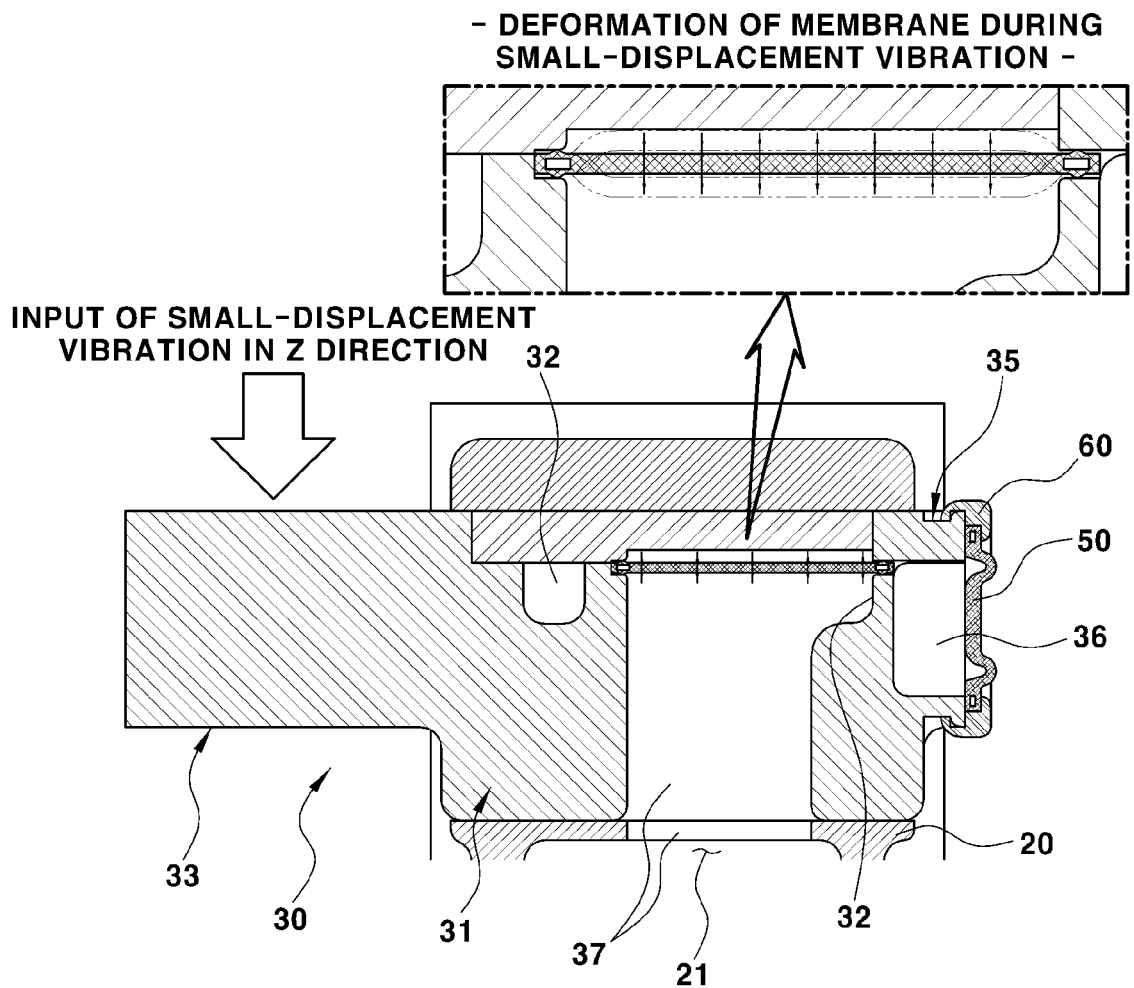
FIG. 10 is a cross-sectional view showing the deformation of the membrane in the transmission mount for a vehicle according to the present invention when small-displacement vibration is input.

The first fluid chamber 21 and the second fluid chamber 36 may be connected to each other to communicate with each other via the orifice 32 formed in the orifice block 31 of the core 30. Accordingly, as shown in FIGS. 6 and 10, the orifice block 31 and the main rubber 20 have first fluid flow apertures 37 formed therein to allow the orifice 32 and the first fluid chamber 21 to communicate with each other, and as shown in FIG. 4, the second fluid chamber 36 may include a second fluid flow aperture 38 formed in the inner wall surface thereof to allow the orifice 32 and the second fluid chamber 36 to communicate with each other.

Accordingly, the orifice 32, which is a fluid passage that connects the first fluid chamber 21 and the second fluid chamber 36 to each other, may be directly formed to a desired length in the core 30, thereby securing freedom for tuning the vibration damping of the transmission mount, thus achieving improved vibration-damping characteristics for attenuating driving vibration. When the orifice 32 is formed in the orifice block 31 of the core 30, the upper portion thereof is in an open state. Therefore, the upper open portion of the orifice 32 needs to be sealed to seal the fluid therein. Accordingly, a core cover 39 may be mounted to the upper portion of the orifice block 31 to cover and seal the orifice 32 in an open state. The core 30 formed as described above may be coupled to the main rubber 20 through two methods.

Figure 2:
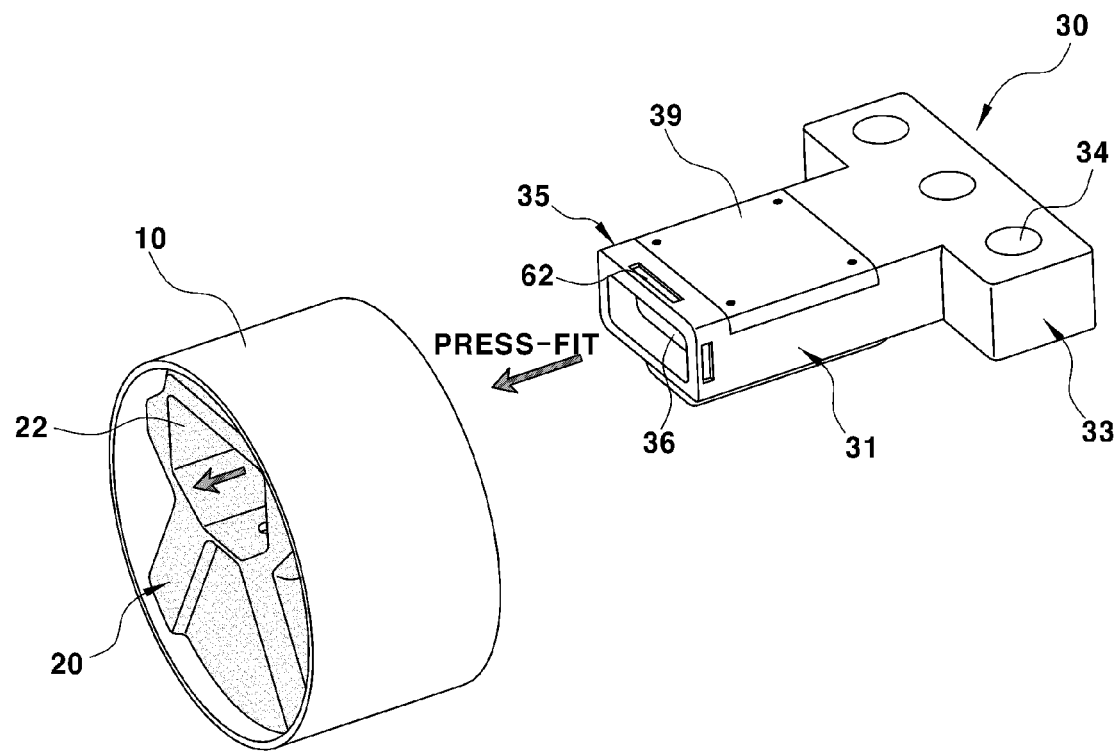
FIGS. 2 and 3 are perspective views showing a method of coupling the core to a main rubber in the transmission mount for a vehicle according to the present invention.
Figure 3:
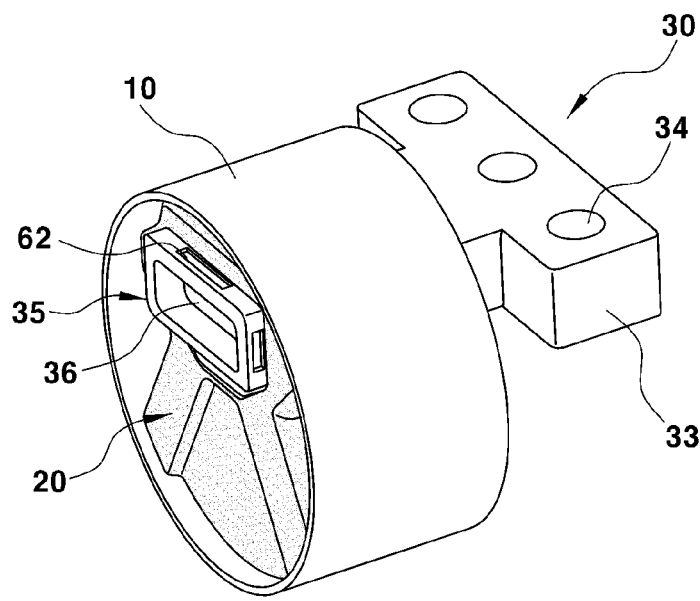

As one method of coupling the core 30 to the main rubber 20, as shown in FIG. 2, a press-fit aperture 22 may be formed in the upper portion of the main rubber 20, and the chamber block 35 and the orifice block 31 of the core 30 may be press-fitted into the press-fit aperture 22. As another method of coupling the core 30 to the main rubber 20, as shown in FIG. 3, when the main rubber 20 is vulcanized and formed on the inner surface of the inner pipe 10, the main rubber 20 may also be vulcanized and formed on the circumference of the orifice block 31 of the core 20.

Once the core 30 is coupled to the main rubber 20, the second fluid chamber 36 formed in the chamber block 35 of the core 30 is may be open toward the outside, and the mounting block 33 may protrude from the main rubber 20 to be mounted to a predetermined position of the transmission (not shown). In addition, a membrane 40 may be mounted in the portion of the orifice 32 that communicates with the first fluid chamber 21, among the entire length of the orifice 32 formed in the orifice block 31 of the core 30.

As shown in FIG. 4, a membrane assembly aperture 41 may be formed in the inner wall surface of the second fluid chamber 36, which is formed in the chamber block 35 of the core 30, to insert the membrane 40 into the portion of the orifice 32 that communicates with the first fluid chamber 21, among the entire length of the orifice 32. In addition, a slide groove 42 may be formed in the upper end portion of the portion of the orifice 32 that communicates with the first fluid chamber 21, among the entire length of the orifice 32 formed in the orifice block 31 of the core 30, and thus, the membrane 40 inserted into the membrane assembly hole 41 may slide in and be fitted into the slide groove 42.

Accordingly, if the membrane 40 is pushed when inserted into the membrane assembly aperture 41, the membrane 40 may be fitted into the slide groove 42. As a result, as shown in FIG. 10, the membrane 40 may be disposed at an upper position in the first fluid flow aperture 37 in the orifice block 31 to be deformable by hydraulic pressure. In particular, as shown in FIG. 7, the membrane 40 may be positioned at the upper end portion of the portion of the orifice 32 that communicates with the first fluid chamber 21, among the entire length of the orifice 32, and thus may be deformed by hydraulic pressure without blocking the orifice 32, which operates as a fluid passage.

In particular, when the membrane 40 is mounted in the portion of the orifice 32 that communicates with the first fluid chamber 21, among the entire length of the orifice 32 formed in the orifice block 31 of the core 30, a membrane capable of absorbing specific low-frequency idle vibration and high-frequency vibration may be selected from among various types of membranes having different degrees of hardness and different thicknesses, and may be fitted into the core 30 in a sliding manner, thereby facilitating absorption of low-frequency idle vibration and high-frequency vibration that are peculiar to respective vehicle models.

Subsequently, an outer pipe 70 for connection to the vehicle body may be assembled to the outer diameter portion of the inner pipe 10 through a swaging process, and a separate bracket (not shown) for assembly to the vehicle body may be mounted to the outer pipe 70 for connection to the vehicle body. Subsequently, to seal the fluid charged into the second fluid chamber 36 in the chamber block 35, the open portion of the second fluid chamber 36 may be sealed using a diaphragm 50 and a diaphragm-fixing frame 60.

For example, the diaphragm 50 may be brought into close contact with the open portion of the second fluid chamber 36 in the chamber block 35, and then the peripheral portion of the diaphragm 50 may be pressed to the peripheral surface of the chamber block 35 using the diaphragm-fixing frame 60, whereby the second fluid chamber 36 is sealed. Accordingly, as shown in FIG. 6, a plurality of fastening ends 61 capable of being caulked or curled may be integrally formed with the edge of the diaphragm-fixing frame 60, and a plurality of fastening recesses 62, into which the fastening ends 61 are inserted and fastened in a caulking or curling manner, may be formed in the circumferential portion of the chamber block 35.

Accordingly, after the diaphragm 50 is brought into close or abutting contact with the open portion of the second fluid chamber 36 in the chamber block 35, as shown in FIGS. 7 and 8, the fastening ends 61 of the diaphragm-fixing frame 60 may be inserted and fastened into the fastening recesses 62 in the chamber block 35 in a caulking or curling manner, whereby the diaphragm 50 may be securely fixed to the second fluid chamber 36 while sealing the same.

As described above, the main rubber 20 may be vulcanized and formed with the inner pipe in a single mold, and one 30 of various types of cores, which includes the orifice 32 having a desired length and the membrane 40 having a desired degree of hardness, may be press-fitted into the press-fit aperture 22 in the main rubber 20, thereby providing a transmission mount having dynamic characteristics suitable for respective vehicle models.

The mounting block 33 of the core 30 may be mounted to a predetermined position of the transmission, and the outer pipe 70 may be mounted to a predetermined position of the vehicle body using the bracket (not shown). Accordingly, the transmission mount of the present invention manufactured as described above may be disposed between the vehicle body and the transmission, and is capable of absorbing vibration therebetween.

Figure 9:
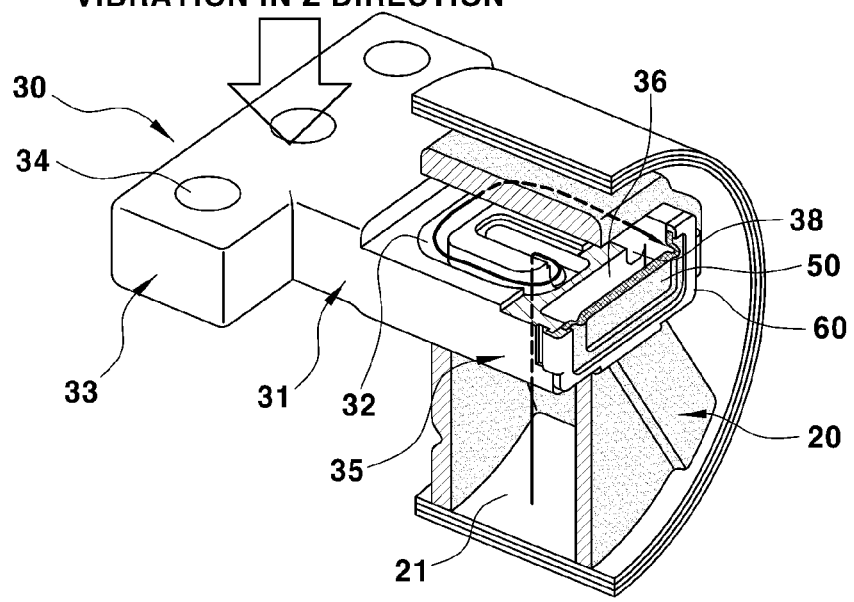
FIG. 9 is a sectional perspective view showing the flow of fluid in the transmission mount for a vehicle according to the present invention when large-displacement vibration is input.

Hereinafter, the operation of the transmission mount of the present invention manufactured to have the structure described above will be described. Referring to FIG. 9, when large-displacement ($\pm 1$ mm) vibration of the transmission is input through the mounting block 33 of the core 30, the fluid in the first fluid chamber 21 may flow to the second fluid chamber 36 through the orifice 32, thereby more easily attenuating the large-displacement vibration.

Referring to FIG. 10, when small-displacement ($\pm 0.2$ mm) vibration of the transmission is input through the mounting block 33 of the core 30, the membrane 40 may be repeatedly deformed upwards and downwards (e.g., vertically) by the fluid in the first fluid chamber 21, which presses the bottom of the membrane 40, and the fluid in the orifice 32, which presses the top of the membrane 40, thereby attenuating the small-displacement vibration.

As is apparent from the above description, the present invention has the following effects.

First, an orifice, which is a fluid passage connecting a first fluid chamber and a second fluid chamber to each other, may be directly formed to a desired length in a core, thereby securing freedom for tuning vibration damping, thus achieving improved vibration-damping characteristics for attenuating driving vibration.

Second, a membrane may be mounted in the portion of the orifice that communicates with the first fluid chamber, among the entire length of the orifice formed in the core, thereby improving low-frequency idle dynamic characteristics and high-frequency dynamic characteristics.

Third, a membrane capable of absorbing specific low-frequency idle vibration and high-frequency vibration may be selected from among various types of membranes having different degrees of hardness and different thicknesses, and may be fitted into the core in a sliding manner, thereby facilitating absorption of low-frequency idle vibration and high-frequency vibration that are peculiar to respective vehicle models.

Fourth, a main rubber may be vulcanized and formed with an inner pipe in a single mold, and one of various types of cores, which includes the orifice having a desired length and the membrane having a desired degree of hardness, may be press-fitted into the main rubber, thereby providing a transmission mount having dynamic characteristics suitable for respective vehicle models.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A transmission mount for a vehicle, comprising:
an inner pipe;
a main rubber vulcanized and formed on an inner surface of the inner pipe to form a first fluid chamber therein;
a core including an orifice block, a mounting block, and a chamber block, wherein:
  the orifice block is fitted into the main rubber and has therein an orifice formed to a predetermined length to connect the first fluid chamber to a second fluid chamber,
  the mounting block is integrally formed with a first side of the orifice block to be mounted to a transmission, and
  the chamber block is integrally formed with a second side of the orifice block and has therein the second fluid chamber;
a membrane mounted in a portion of the orifice that communicates with the first fluid chamber;
a diaphragm coupled to the chamber block to seal the second fluid chamber; and
an outer pipe coupled to an outer diameter portion of the inner pipe to be connected to a vehicle body,
wherein the first fluid chamber is arranged radially between the core and the inner pipe, and a fluid is configured to flow radially between the first fluid chamber and the orifice block and axially between the orifice block and the second fluid chamber.

2. The transmission mount of claim 1, wherein the orifice block and the main rubber have first fluid flow apertures formed therein to allow the orifice and the first fluid chamber to communicate with each other, and the second fluid chamber has a second fluid flow aperture formed in an inner wall surface thereof to connect the orifice and the second fluid chamber with each other.

3. The transmission mount of claim 1, wherein a membrane assembly aperture is formed in an inner wall surface of the second fluid chamber formed in the chamber block of the core, to insert the membrane into the portion of the orifice that communicates with the first fluid chamber.

4. The transmission mount of claim 3, wherein a slide groove is formed in the portion of the orifice that communicates with the first fluid chamber and wherein the membrane inserted into the membrane assembly apertures slides in and is fitted into the slide groove.

5. The transmission mount of claim 1, wherein a diaphragm-fixing frame is mounted to the chamber block of the core to press and fix a peripheral portion of the diaphragm to a peripheral surface of the chamber block.

6. The transmission mount of claim 5, wherein fastening ends are integrally formed with an edge of the diaphragm-fixing frame, and wherein fastening recesses are formed in a circumferential portion of the chamber block to insert and fasten the fastening ends thereinto in a caulking or curling manner.

7. The transmission mount of claim 1, wherein a core cover is mounted to an upper portion of the orifice block to cover and seal the orifice in an open state.

8. The transmission mount of claim 1, wherein a press-fit aperture is formed in an upper portion of the main rubber, and wherein the orifice block of the core is press-fitted into the press-fit aperture.

9. The transmission mount of claim 1, wherein, when the main rubber is vulcanized and formed in the inner pipe, the orifice block of the core is vulcanized and formed together with the main rubber.

10. The transmission mount of claim 1, wherein, when large-displacement vibration of a transmission is input through the mounting block of the core, fluid in the first fluid chamber flows to the second fluid chamber through the orifice to attenuate the large-displacement vibration.

11. The transmission mount of claim 1, wherein, when small-displacement vibration of a transmission is input through the mounting block of the core, fluid in the first fluid chamber presses the membrane to deform the membrane upwards and downwards to attenuate the small-displacement vibration.

12. A transmission mount for a vehicle, comprising:
an inner pipe;
a main rubber vulcanized and formed on an inner surface of the inner pipe to form a first fluid chamber therein;
a core including an orifice block, a mounting block, and a chamber block, wherein:
  the orifice block is fitted into the main rubber and has therein an orifice formed to a predetermined length to connect the first fluid chamber to a second fluid chamber,
  the mounting block is integrally formed with a first side of the orifice block to be mounted to a transmission, and
  the chamber block is integrally formed with a second side of the orifice block and has therein the second fluid chamber;
a membrane mounted in a portion of the orifice that communicates with the first fluid chamber;
a diaphragm coupled to the chamber block to seal the second fluid chamber; and an outer pipe coupled to an outer diameter portion of the inner pipe to be connected to a vehicle body,
wherein a membrane assembly aperture for inserting the membrane into a portion of the orifice is formed in an inner wall surface of the second fluid chamber formed in the chamber block of the core.

\* \* \* \* \*